US010009774B2

(12) United States Patent
Trainin et al.

(10) Patent No.: US 10,009,774 B2
(45) Date of Patent: Jun. 26, 2018

(54) APPARATUS, SYSTEM AND METHOD OF WIRELESS TRANSMISSION OVER A BONDED CHANNEL

(71) Applicant: INTEL IP CORPORATION, Santa Clara, CA (US)

(72) Inventors: Solomon B. Trainin, Haifa (IL); Assaf Kasher, Haifa (IL); Laurent Cariou, Portland, OR (US); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 149 days.

(21) Appl. No.: 14/998,245

(22) Filed: Dec. 26, 2015

(65) Prior Publication Data

US 2017/0034838 A1    Feb. 2, 2017

Related U.S. Application Data

(60) Provisional application No. 62/198,795, filed on Jul. 30, 2015.

(51) Int. Cl.
*H04W 72/08*   (2009.01)
*H04W 16/14*   (2009.01)
(Continued)

(52) U.S. Cl.
CPC ....... *H04W 16/14* (2013.01); *H04W 74/0808* (2013.01); *H04W 72/0453* (2013.01)

(58) Field of Classification Search
CPC .............. H04W 16/14; H04W 74/0808; H04W 72/0453

USPC ......................................................... 370/329
See application file for complete search history.

(56) References Cited

U.S. PATENT DOCUMENTS 9,288,844 B1 *    3/2016   Akhavan-Saraf ..... H04W 88/10
2014/0071873 A1 *  3/2014   Wang .................... H04W 74/08
                                              370/311
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Andrew Chriss
*Assistant Examiner* — Ellen Kirillova
(74) *Attorney, Agent, or Firm* — Shichrur & Co.

(57) ABSTRACT

Some demonstrative embodiments include apparatuses, devices, systems and methods of wireless transmission over a bonded channel. For example, a wireless station may be configured to determine a Clear Channel Assessment (CCA) busy state of a secondary channel in a directional wireless communication band upon detecting transmission of a first packet over the secondary channel; to determine a CCA idle state of the secondary channel upon detecting transmission of a second packet indicating an end of a transmission sequence including the first packet; and to process transmission of a wireless transmission over a bonded channel including a primary channel and the secondary channel, if the CCA state of the secondary channel and a CCA state of the primary channel are idle during at least a back-off and an InterFrame Space (IFS).

25 Claims, 7 Drawing Sheets

(51) Int. Cl.
*H04W 72/04* (2009.01)
*H04W 74/08* (2009.01)

(56) References Cited

U.S. PATENT DOCUMENTS

| | | | | | |
|---|---|---|---|---|---|
| 2014/0341110 | A1* | 11/2014 | Sadeghi | ................ | G06F 13/385 370/328 |
| 2016/0165637 | A1* | 6/2016 | Kim | ...................... | H04W 28/18 370/329 |
| 2016/0381565 | A1* | 12/2016 | Oteri | ..................... | H04W 16/14 370/328 |

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Wigig Wireless Gigabit Alliance, Wigig MAC and PHY Specification Version 1.1, Apr. 2011, 442 pages.

* cited by examiner

APPARATUS, SYSTEM AND METHOD OF WIRELESS TRANSMISSION OVER A BONDED CHANNEL

CROSS REFERENCE

This application claims the benefit of and priority from U.S. Provisional Patent Application No. 62/198,795 entitled "Apparatus, System and Method of Clear Channel Assessment (CCA) of a wireless channel", filed Jul. 30, 2015, the entire disclosure of which is incorporated herein by reference.

TECHNICAL FIELD

Embodiments described herein generally relate to a wireless transmission over a bonded channel.

BACKGROUND

A wireless communication network in a millimeter-wave band may provide high-speed data access for users of wireless communication devices.

According to some Specifications and/or Protocols, devices may be configured to perform all transmissions and receptions over a single channel bandwidth (BW).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

Furthermore, reference numerals may be repeated among the figures to indicate corresponding or analogous elements. The figures are listed below.

DETAILED DESCRIPTION

Figure 1:
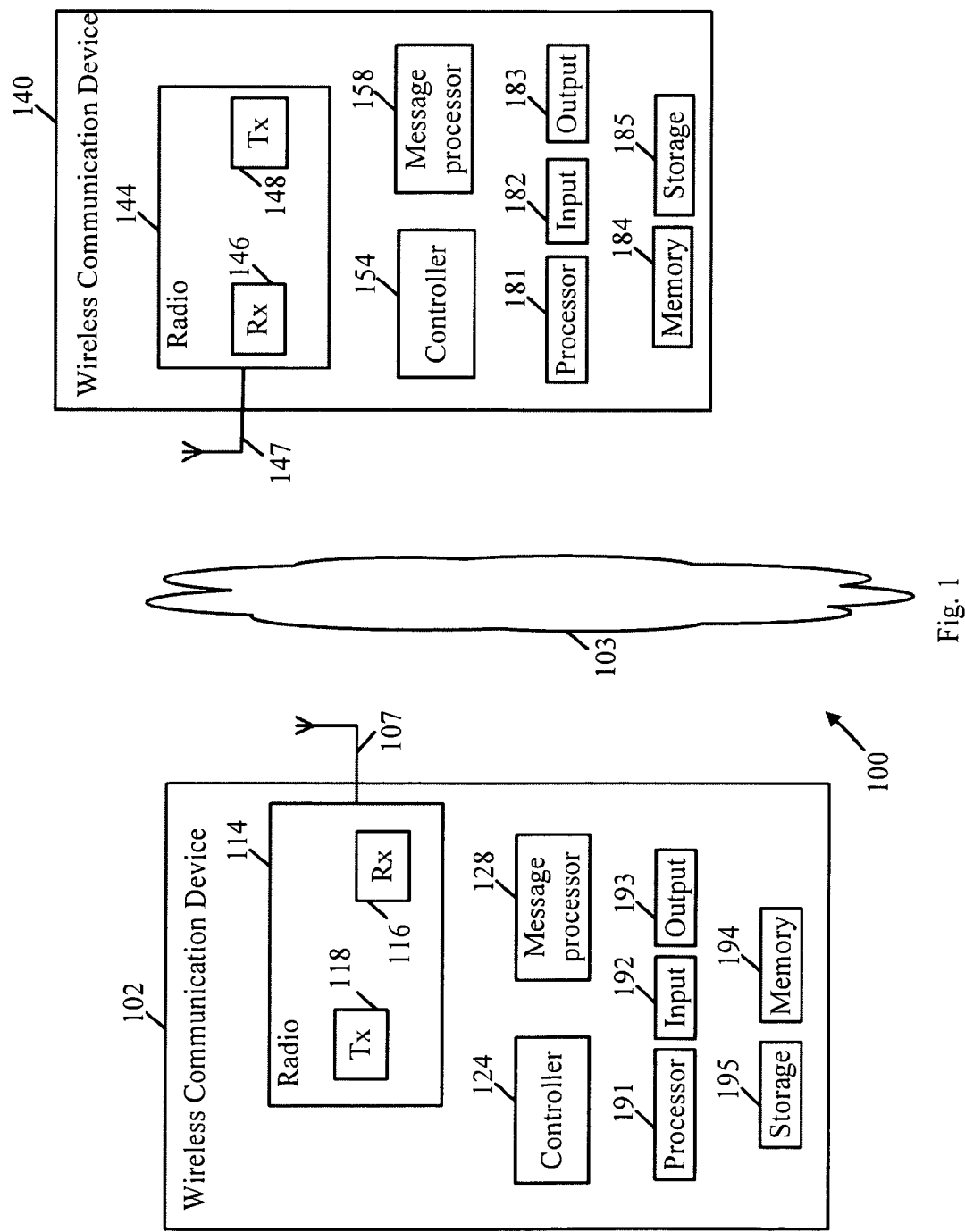
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications,* Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: Enhancements for Very High Throughput in the 60 *GHz Band"*, 28 Dec. 2012); IEEE-802.11REVmc ("*IEEE* 802.11-*REVmc™/D3.0, June* 2014 draft standard for Information technology—Telecommunications and information exchange between systems Local and metropolitan area networks Specific requirements; Part 11: *Wireless LAN Medium Access Control (MAC) and Physical Layer (PHY) Specification*"); IEEE 802.11ax (*IEEE* 802.11*ax, High Efficiency WLAN (HEW)*); IEEE802.11-ay (*P802.11ay Standard for Information Technology—Telecommunications and Information Exchange Between Systems Local and Metropolitan Area Networks— Specific Requirements Part* 11: *Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (SIG) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include, operate as, and/or perform the functionality of, at least one DMG STA, and/or device 140 may include, operate as, and/or perform the functionality of, at least one DMG STA.

In other embodiments, devices 102 and/or 140 may perform the functionality of any other wireless device and/or station, e.g., a WLAN STA, a WiFi STA, and the like.

In some demonstrative embodiments, device 102 and/or device 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG bands and/or channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, a mmWave band, and/or any other band, for example, a 2.4 GHz band, a 5 GHz band, a SIG band, and/or any other band.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/ or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some communications over a wireless communication band, for example, a DMG band or any other band, may be performed over a single channel bandwidth (BW). For example, the IEEE 802.11ad Specification defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel.

Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to communicate over a Next Generation 60 GHz (NG60) network, an Extended DMG (EDMG) network, and/or any other network. For example, devices 102 and/or 140 may be configured to use channel bonding, for example, for communicating over the NG60 and/or EDMG networks.

In some demonstrative embodiments, communication over a bonded channel may be performed by communicating over a primary channel and at least one secondary channel.

In some demonstrative embodiments, devices 102 and/or 140 may be configured to perform carrier sensing (CS) in one or more secondary channels, for example, when communicating over one or more bonded channels, e.g., as described below.

In some demonstrative embodiments, in some implementations a physical and/or virtual carrier sense (CS) mechanism may be applicable for a primary channel, e.g., only for the primary channel, for example, while in the secondary channels, physical CS may be limited to energy detection, which may be provided, for example, in each secondary channel, e.g., simultaneously and in parallel to the primary channel.

In some demonstrative embodiments, interferences may be caused by transmission over a bonded channel in a directional band, e.g., a DMG band, for example, if communications by other stations are not properly detected over one or more secondary channels, e.g., as described below.

For example, a channel sensing mechanism may be based on Clear Channel Assessment (CCA) of the secondary channel during a Point Coordination Function (PCF) Inter-Frame Space (PIFS) time interval before a start of a transmit opportunity (TXOP). According to this mechanism ("the PIFS-based CCA mechanism") a station may be allowed to transmit a physical layer (PHY) protocol data unit (PPDU) in a bonded channel including a secondary channel, for example, if the secondary channel is idle during PIFS immediately preceding the start of a TXOP.

In one example, the PIFS-based CCA mechanism may be applicable for omni-propagation frequency bands, in which an entire Short Inter-Frame Space (SIFS) separated sequence may be detected by any station.

However, propagation in a directional band, for example, the directional multi-gigabit (DMG) band, may not be omni-directional and, accordingly, in some cases the entire SIFS separated sequence may not be detected by a station, and, accordingly, observation of a PIFS idle time may lead to false CCA identification and/or may cause interference in the secondary channel, e.g., as described below with reference to FIG. 2.

There is no known solution of CS in secondary channels of bonded channels, e.g., in a DMG network, which may solve at least this problem.

Figure 2:
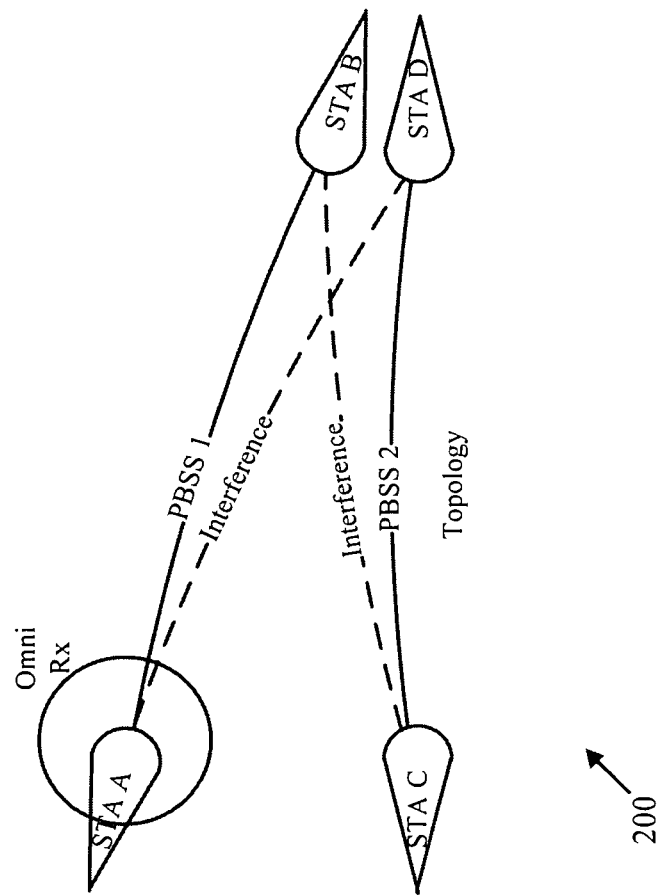
FIG. 2 is a schematic illustration of a network topology, in accordance with some demonstrative embodiments.

Reference is made to FIG. 2, which schematically illustrates a network topology 200, in accordance with some demonstrative embodiments.

In some demonstrative embodiments, network topology 200 illustrates interferences in a secondary channel of a bonded channel, for example, which may be caused by communications of by one or more stations of network topology 200, e.g., as described below.

As shown in FIG. 2, in some demonstrative embodiments network topology 200 may include at least two interfering networks, denoted PBSS1 and PBSS2.

As shown in FIG. 2, in some demonstrative embodiments the network PBSS1 may include a first station, denoted STA A, and a second station, denoted STA B.

As shown in FIG. 2, in some demonstrative embodiments the network PBSS2 may include a first station, denoted, STA C, and a second station, denoted STA D.

In some demonstrative embodiments, the STA A may communicate, e.g., with the STA B, over a wide channel, e.g., a bonded channel, which may include a primary channel and at least one secondary channel. For example, the STA A may perform the functionality of device 102 (FIG. 1), and/or the STA B may perform the functionality of device 140 (FIG. 1).

In some demonstrative embodiments, the STA C and the STA D may communicate over one or more channels including the same secondary channel of the wide channel being used by the STA A and the STA B. In one example, the STA C and the STA D may communicate over a bonded channel including the secondary channel being used by the STA A and the STA B.

In some demonstrative embodiments, the STA A may not be able, for example, to listen to and/or detect transmissions of the STA C, and/or the STA C may not be able, for example, to listen to and/or detect transmissions of the STA A, e.g., due to the directionality of the transmissions.

In some demonstrative embodiments, as shown in FIG. 2, the STA B may be exposed to interfering transmissions from the STA C, e.g., over the secondary channel; and/or the STA D may be exposed to interfering transmissions from the STA A, e.g., over the secondary channel, for example, if the STAs A, B, C and/or D are not able to properly detect and/or sense transmissions over the secondary channel, e.g., as described below.

Figure 3:
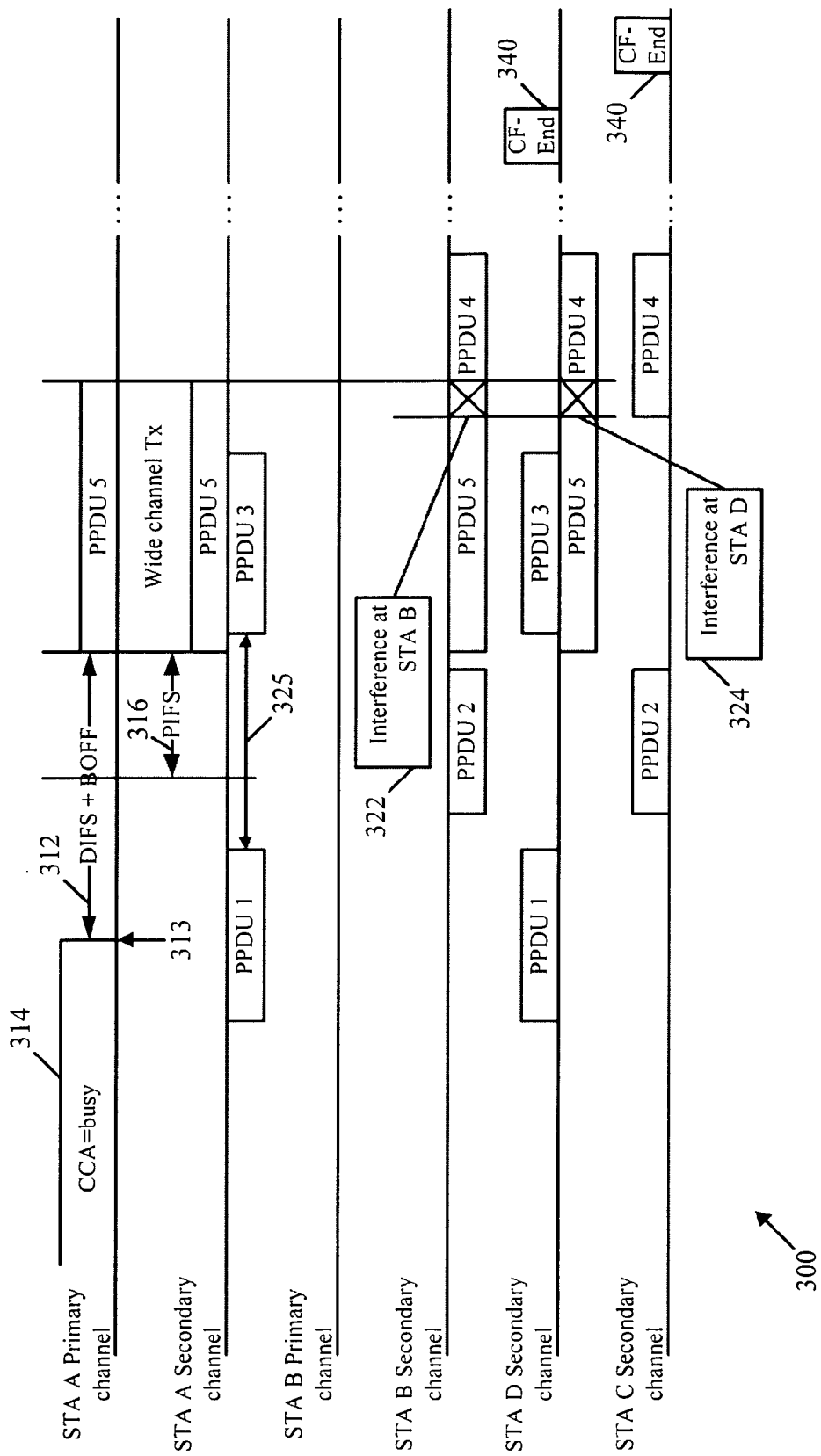
FIG. 3 is a schematic illustration of interference caused by communication over a secondary channel of a bonded channel.

Reference is made to FIG. 3, which schematically illustrates interference caused by communications over a secondary channel of a bonded channel.

In some demonstrative embodiments, the interference of FIG. 3 may be caused, for example, by one or more communications of wireless stations in a network topology, e.g., the network topology 200 (FIG. 2), for example, if the PIFS-based CCA mechanism is used.

In some demonstrative embodiments, as shown in FIG. 3, the STA A and the STA B of FIG. 2 may communicate over a bonded channel including a primary channel and a secondary channel.

In some demonstrative embodiments, as shown in FIG. 3, the STA C and the STA D of FIG. 2 may also communicate over the secondary channel.

In some demonstrative embodiments, as shown in FIG. 3, the STA A may start to measure an idle period 312, for example, including at least a backoff (BOFF), for example, based on a Clear Channel Assessment (CCA) 314 on the primary channel of STA A, for example, at a time 313 in which the CCA is idle (end of CCA=busy) in the primary channel.

As shown in FIG. 3, the STA A may detect the secondary channel to be idle for a PIFS time 316, e.g., right before the idle period 312 expires in the primary channel.

In some demonstrative embodiments, as shown in FIG. 3, a transmission of a PPDU, denoted PPDU 5, from the STA A to the STA B over the bonded channel may interfere with transmissions exchanged between the STA C and the STA D, for example, if the STA A is allowed to start the wide transmission of the PPDU 5 over the bonded channel, for example, based on the detected idle state of the secondary channel during only the PIFS 316, e.g., as described below.

In some demonstrative embodiments, as shown in FIG. 3, the transmission of PPDU5 by the STA A may interfere with one or more PPDUs of a sequence of transmissions exchanged between the STA D and the STA C. For example, as shown in FIG. 3, the transmission of PPDU5 by the STA A may interfere with a transmission of one or more PPDUs from the STA C in the secondary channel, e.g., as described below.

In some demonstrative embodiments, as shown in FIG. 3, the sequence of transmissions between the STA D and the STA C may include a transmission of first and second PPDUs, denoted PPDU1 and PPDU3, from the STA D to the STA C in the secondary channel, which may be visible to an energy detection function of the STA A, for example, according to network topology 200 (FIG. 2), e.g., as described above.

In some demonstrative embodiments, as shown in FIG. 3, the sequence of transmissions between the STA D and the STA C may also include a transmission of a PPDU, denoted PPDU2, from the STA C to the STA D, which may not be visible to the energy detection function of the STA A, for example, according to network topology 200 (FIG. 2), e.g., as described above.

In some demonstrative embodiments, as shown in FIG. 3, at least part of the sequence of transmissions exchanged between the STA D and the STA C in the secondary channel, e.g., the transmission of PPDU2 from the STA C to the STA D, may not be detected by the energy detection function of the STA A on the secondary channel, e.g., during a time interval 325 between the transmissions of the PPDU1 and the PPDU3.

In some demonstrative embodiments, as shown in FIG. 3, the time interval 325 of transmission PPDU2 between the transmissions of PPDU1 and PPDU3 may be longer than PIFS 316, and, accordingly, the time interval 325 may be estimated as being "secondary channel idle" by the STA A.

In some demonstrative embodiments, as shown in FIG. 3, allowing the STA A to transmit the PPDU5 to STA B over the wide channel that includes the primary and secondary channels between STA A and STA B, for example, based on the detected idle state of the secondary channel during only the PIFS 316, may result in interference between the PPDU 5 and a PPDU, denoted PPDU 4, which may be transmitted from the STA C to the STA D. For example, as shown in FIG. 3, transmission of the PPDU4 may cause interference 322 to reception of the PPDU5 at the STA B, and/or transmission of the PPDU5 may cause interference 324 to reception of the PPDU4 at the STA D.

In some demonstrative embodiments, as shown in FIG. 3, the sequence of transmissions exchanged between the STA D and the STA C in the secondary channel may end, for example, upon transmission of one or more Contention-Free end (CF-end) packets 340.

Referring back to FIG. 1, in some demonstrative embodiments, devices 102 and/or 140 may be configured to apply a mechanism to reduce and/or mitigate interference over a secondary channel of a bonded channels, e.g., as described below.

In some demonstrative embodiments, devices 102 and/or 140 may be configured to identify patterns of energy detected in secondary channels as a CS of an ongoing activity, and/or to detect an indication of an end of the ongoing activity, e.g., as described below.

In some demonstrative embodiments, devices 102 and/or 140 may be configured to detect a Clear Channel Assessment (CCA) idle state over the secondary channel, for example, by detecting a CF-End frame.

In some demonstrative embodiments, the CF-End frame may be identified, for example, based on a specific size of the frame, or by a trailer that is appended to CF-End PPDU to identify this frame, for example, even without decoding the frame, e.g., as described below.

In some demonstrative embodiments, devices 102 and/or 140 may be configured to determine a CCA idle state of a primary channel during a transmit opportunity (TxOP); to determine a CCA busy state of a secondary channel upon detecting a transmission over the secondary channel; and/or to determine a CCA idle state of the secondary channel, for example, upon detecting an indication of an end of a transmission sequence over the secondary channel, e.g., as described below.

In some demonstrative embodiments, devices 102 and/or 140 may be configured to allow transmitting a wireless transmission over a bonded channel including the primary channel and the secondary channel, for example, based on the CCA idle state of the secondary channel and a CCA, e.g., a full or regular, CCA on the primary channel, e.g. as described below.

In some demonstrative embodiments, controller 124 may be configured to control, cause and/or trigger device 102 to transmit over a bonded channel including a secondary channel in a directional wireless communication band, for example, based at least on a CCA state of the secondary channel, and the full or regular CCA on the primary channel, e.g., as described below.

In some demonstrative embodiments, controller 124 may be configured to control, cause and/or trigger device 102 to determine a CCA busy state of the secondary channel, for example, upon detecting transmission of a first packet over the secondary channel.

In some demonstrative embodiments, the first packet may include a PPDU communicated between other stations, e.g., the PPDU1 of FIG. 3.

In one example, device 102 may be configured to detect the CCA busy state of the secondary channel upon detecting transmission of the PPDU1 of FIG. 3 over the secondary channel.

In some demonstrative embodiments, controller 124 may be configured to control, cause and/or trigger device 102 to detect the transmission of the first packet, for example, based on a sensed energy on the secondary channel.

In some demonstrative embodiments, controller 124 may be configured to control, cause and/or trigger device 102 to determine a CCA idle state of the secondary channel upon detecting transmission of a second packet indicating an end of a transmission sequence including the first packet.

In some demonstrative embodiments, the second packet indicating the end of the transmission sequence may include a CF-End packet, or any other packet, which may be configured to indicate the end of the transmission sequence.

In one example, device 102 may be configured to detect the CCA idle state of the secondary channel upon detecting transmission of the CF-End packet.

In some demonstrative embodiments, controller 124 may be configured to control, cause and/or trigger device 102 to detect the transmission of the second packet based on a sensed energy pattern on the secondary channel, for example, by detecting a predefined energy pattern corresponding to the CF-End packet.

In some demonstrative embodiments, the second packet may include a signature field, which may be configured to generate a predefined energy pattern, which may be detected by device 102.

In some demonstrative embodiments, controller 124 may be configured to control, cause and/or trigger device 102 to detect the transmission of the second picket based on a duration of the second packet.

In other embodiments, device 102 may be configured to detect the second packet, which includes the CF-End packet, for example, by any other and/or additional mechanism, algorithms, and/or methods.

In one example, device 140 may be configured to transmit the CF-end packet, for example, to indicate an end of a transmission sequence between device 140 and another device. According to this example, device 102 may be configured to detect the CF-end packet, for example, based on a duration of the CF-End packet and/or based on the signature field of the CF-End packet, e.g., even without needing to decode other fields of the CF-end packet.

Figure 4:
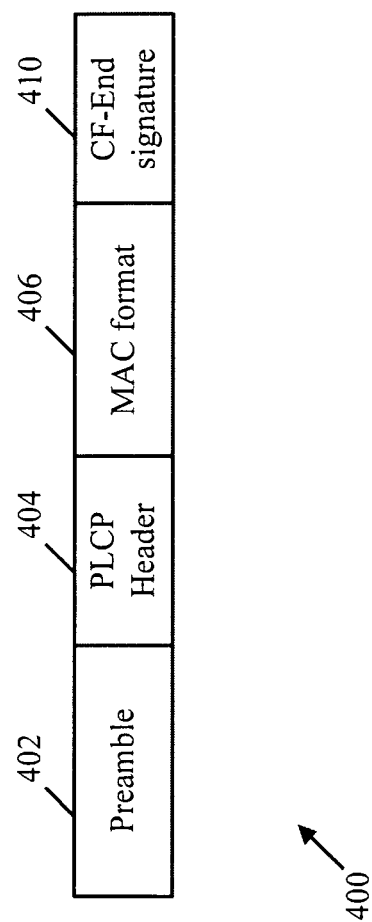
FIG. 4 is a schematic illustration of a packet format, in accordance with some demonstrative embodiments.

Reference is made to FIG. 4, which schematically illustrates a packet format 400, in accordance with some demonstrative embodiments.

In some demonstrative embodiments, a wireless station, e.g., device 140 (FIG. 1), may be configured to generate and transmit a packet having packet format 400, for example, to enable another device, e.g., device 102 (FIG. 1) to identify an end of a transmission sequence. For example, message processor 128 (FIG. 1) and/or controller 124 (FIG. 1) may be configured to identify an end of a transmission sequence based on a detection of a packet having packet format 400.

In some demonstrative embodiments, packet format 400 may include a packet structure of a CF-End packet.

Although FIG. 4 illustrates a packet format 400 of a CF-end packet, in other embodiments one or more other packets, for example, control packets, e.g., a Request to Send (RTS) packet and/or a Clear to Send (CTS) packet, may have a format based on the packet format shown in FIG. 4.

As shown in FIG. 4, a PPDU according to packet format 400 may include a preamble 402, a Physical Layer Convergence Protocol (PLCP) header 404, a MAC format field 406, and a CF-End signature field 410.

In some demonstrative embodiments, CF-End signature field 410 may include a unique signature appended to the PPDU, for example, at the end of the PPDU.

In some demonstrative embodiments, CF-End signature field 410 may be configured to generate a sensed energy pattern on the secondary channel, which may be detectable by a device, e.g., device 102 (FIG. 1), and may allow the device to identify that the PPDU is a CF-End packet.

In some demonstrative embodiments, device 102 (FIG. 1) may be configured to detect the transmission of the CF-End packet, for example, based on CF-End signature field 410, e.g., even without needing to decode other fields of the CF-end packet.

In some demonstrative embodiments, a device, e.g., device 102 (FIG. 1), may be configured to detect PPDU, which includes a CF-End packet, by any other additional or alternative mechanism, for example, by measuring a duration of the PPDU.

Referring back To FIG. 1, in some demonstrative embodiments, device 102 may detect signature field 410 (FIG. 4) and/or a duration of a CF-END packet, e.g., a duration of packet format 400 (FIG. 4).

In some demonstrative embodiments, device 102 may determine that the CCA state of the secondary channel is idle, for example, based on the detection of the CF-End packet.

In some demonstrative embodiments, controller 124 may be configured to control, cause and/or trigger device 102 to process transmission of a wireless transmission over a bonded channel including a primary channel and the secondary channel, for example, if the CCA states of the secondary channel and the primary channel are both idle during at least an InterFrame Space (IFS) and a back-off.

In some demonstrative embodiments, controller 124 may be configured to control, cause and/or trigger device 102 to process the transmission of the wireless transmission over the bonded channel, for example, if the CCA states of the primary channel and the secondary channel are both idle during at least a Distributed Coordination Function (DCF) IFS (DIFS) and the back-off.

Figure 5:
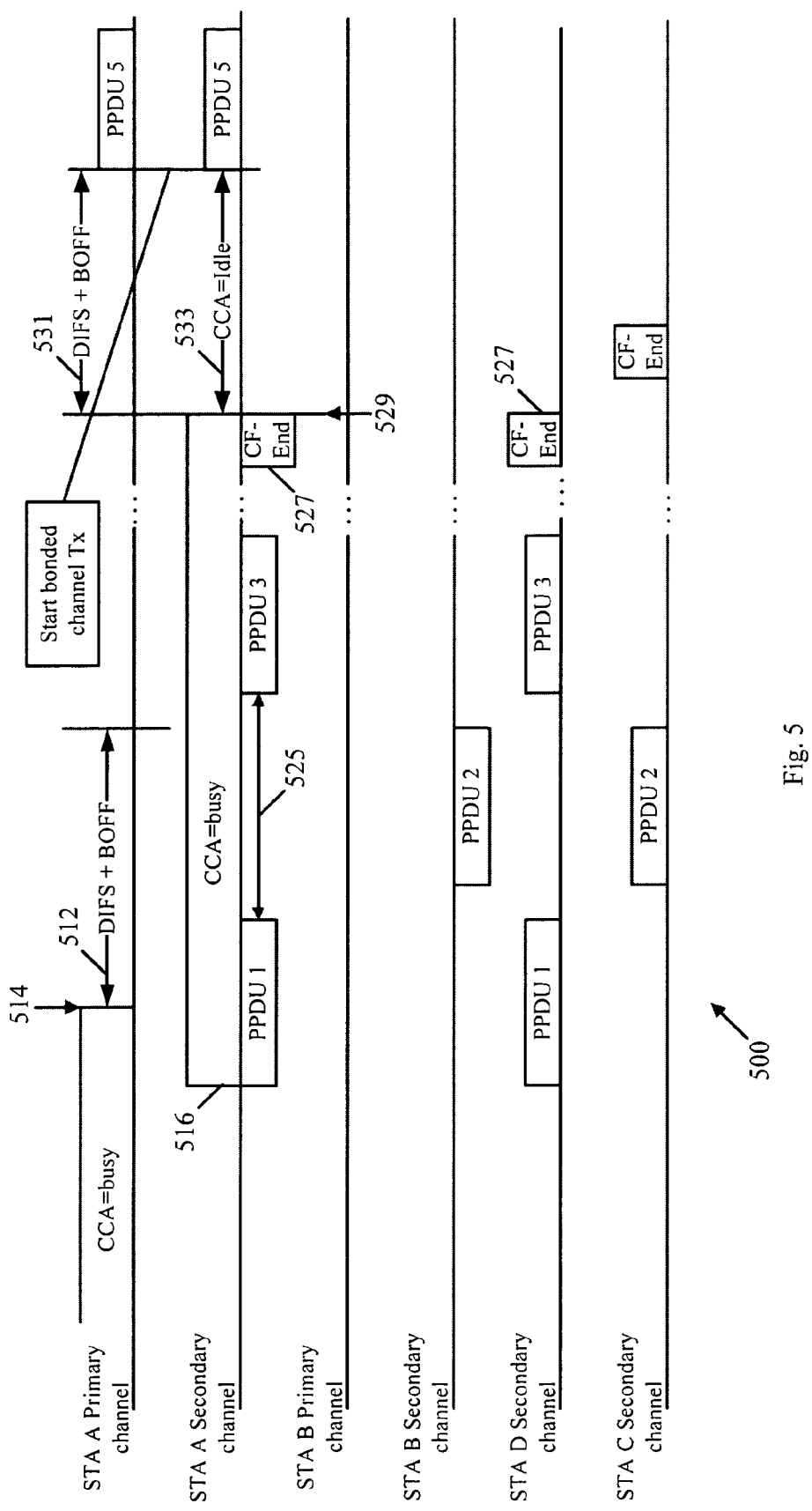
FIG. 5 is a schematic illustration of communications by a wireless station over a primary channel and a secondary channel, in accordance with some demonstrative embodiments.

In some demonstrative embodiments, configuring a device, e.g., device 102, to determine the CCA idle state of the secondary channel by detecting the indication of the end of the transmission sequence over the secondary channel, and allowing the device to process the transmission over the bonded channel, for example, only after detecting that the CCA states of the primary channel and the secondary channel are idle during at least the DIFS and the back-off, e.g., as described above, may provide a solution, which may reduce, or even eliminate, interference over the secondary channel of the bonded channel, for example, in a DMG network, e.g., as described below with reference to FIG. 5.

In some demonstrative embodiments, this solution, e.g., as described above, may enable, for example, to diminish interference in the secondary channel and/or to improve fairness and/or link utilization, for example, when multiple links share the same secondary channels, e.g., as described above with reference to FIG. 2.

Reference is made to FIG. 5, which schematically illustrates a communication scheme 500 of communications of a wireless station (STA A) over a primary channel and a secondary channel, in accordance with some demonstrative embodiments. For example, device 102 (FIG. 1) may be configured to operate as, or perform the functionality of, the STA A of FIG. 5.

In some demonstrative embodiments, communication scheme 500 may be applied in a network topology, e.g., network topology 200 (FIG. 2), which may include multiple links sharing one or more same secondary channels.

In some demonstrative embodiments, the STA A may be configured to communicate with a STA, denoted STA B, over a bonded channel including a primary channel and a secondary channel.

In some demonstrative embodiments, the secondary channel may also be used for communication by one or more other stations, for example, the STA C and the STA D.

In some demonstrative embodiments, the STA C and the STA D may communicate over one or more channels including the secondary channel of the bonded channel being used by the STA A and the STA B. In one example, the STA C and the STA D may communicate over a bonded channel including the secondary channel being used by the STA A and the STA B.

In some demonstrative embodiments, as shown in FIG. 5, for example, a transmission sequence between a STA D and a STA C over the secondary channel may include a transmission of a PPDU, denoted PPDU1, from the STA D to the STA C, followed by a transmission of a PPDU, denoted PPDU 2, from the STA C to the STA D, which in turn may be followed by a transmission of a PPDU, denoted PPDU3, from the STA D to the STA C. The transmission sequence between a STA D and a STA C over the secondary channel may end with transmission of at least one CF-END frame, for example, a CF-End frame 527, which may be transmitted, for example, from the STA D to the STA C.

In some demonstrative embodiments, the STA A may not be able, for example, to listen to and/or detect transmissions of the STA C, and/or the STA C may not be able, for example, to listen to and/or detect transmissions of the STA A, e.g., due to the directionality of the transmissions.

For example, the PPDU 1 and the PPDU 3 of the transmission sequence between the STA C and the STA D may be visible to the STA A, while the PPDU 2 may not be visible to, or detectable by, the STA A.

According to this example, the sequence of transmissions exchanged between the STA D and the STA C in the secondary channel may not be detected by the STA A, for example, when a time period 525 lapsed between the transmissions of PPDU1 and PPDU3, which may be visible to the STA A, is longer than a PIFS, and the transmission of the PPDU2 during the time period 525 is not visible to the STA A.

In some demonstrative embodiments, as shown in FIG. 5, the STA A may be configured start a backoff (BOFF) and DIFS period 512 on the primary channel at a time 514 at which the CCA state of the primary channel is idle, e.g., at an end of CCA=busy state of the primary channel.

In some demonstrative embodiments, as shown in FIG. 5, the STA A may determine a CCA busy state 516 of the secondary channel, for example, upon detecting a carrier of the PPDU1. For example, controller 124 (FIG. 1) may be configured to control, cause and/or trigger device 102 (FIG. 1) to determine the CCA busy state of the secondary channel, for example, upon detecting the transmission of PPDU1 over the secondary channel.

In some demonstrative embodiments, as shown in FIG. 5, the STA A may maintain the CCA busy state 516 of the secondary channel, for example, until identifying a PPDU indicating an end of the transmission sequence including the PPDU1 over the secondary channel.

In some demonstrative embodiments, as shown in FIG. 5, the STA A may maintain the CCA busy state 516, for example, until identifying and/or detecting the CF-End PPDU 527.

In some demonstrative embodiments, the STA A may identify the CF-End PPDU 527, for example, based on a duration of CF-End PPDU 527 and/or based on a CF-End signature field of CF-End PPDU 527, e.g., the CF-End signature field 410 (FIG. 4), as described above.

In some demonstrative embodiments, as shown in FIG. 5, the STA A may start, e.g., at a time 514, a period 512 including an IFS, e.g., a DIFS, and a backoff on the primary channel, for example, after detecting, e.g., only after detecting, an end of a virtual or physical CCA busy state, e.g., over the primary channel.

In some demonstrative embodiments, as shown in FIG. 5, the STA A may determine a CCA idle state 533 of the secondary channel, for example, after detecting, e.g., only after detecting, the CF-End PPDU 527, e.g., at a time 529.

For example, controller 124 (FIG. 1) may be configured to control, cause and/or trigger device 102 (FIG. 1) to determine the CCA idle state of the secondary channel, for example, upon detecting the CF-End PPDU 527.

In some demonstrative embodiments, as shown in FIG. 5, the STA A may transmit a PPDU5 to STA B, for example, if, e.g., only if, the CCA idle state 533 of the secondary channel is maintained during the DIFS and BOFF period 531, e.g., while the CCA state of the primary channel is also idle.

For example, controller 124 (FIG. 1) may be configured to control, cause and/or trigger device 102 (FIG. 1) to process the transmission of a PPDU, denoted PPDU5, over the bonded channel, for example, only if the CCA state of the secondary channel is idle at least during the period 531, e.g., while the CCA state of the primary channel is also idle.

In some demonstrative embodiments, as shown in FIG. 5, as a result, the transmission of PPDU5 from the STA A may not interfere with the transmission sequence between STA C and STA D, and/or a probability of success of a forthcoming transmission may increase.

Figure 6:
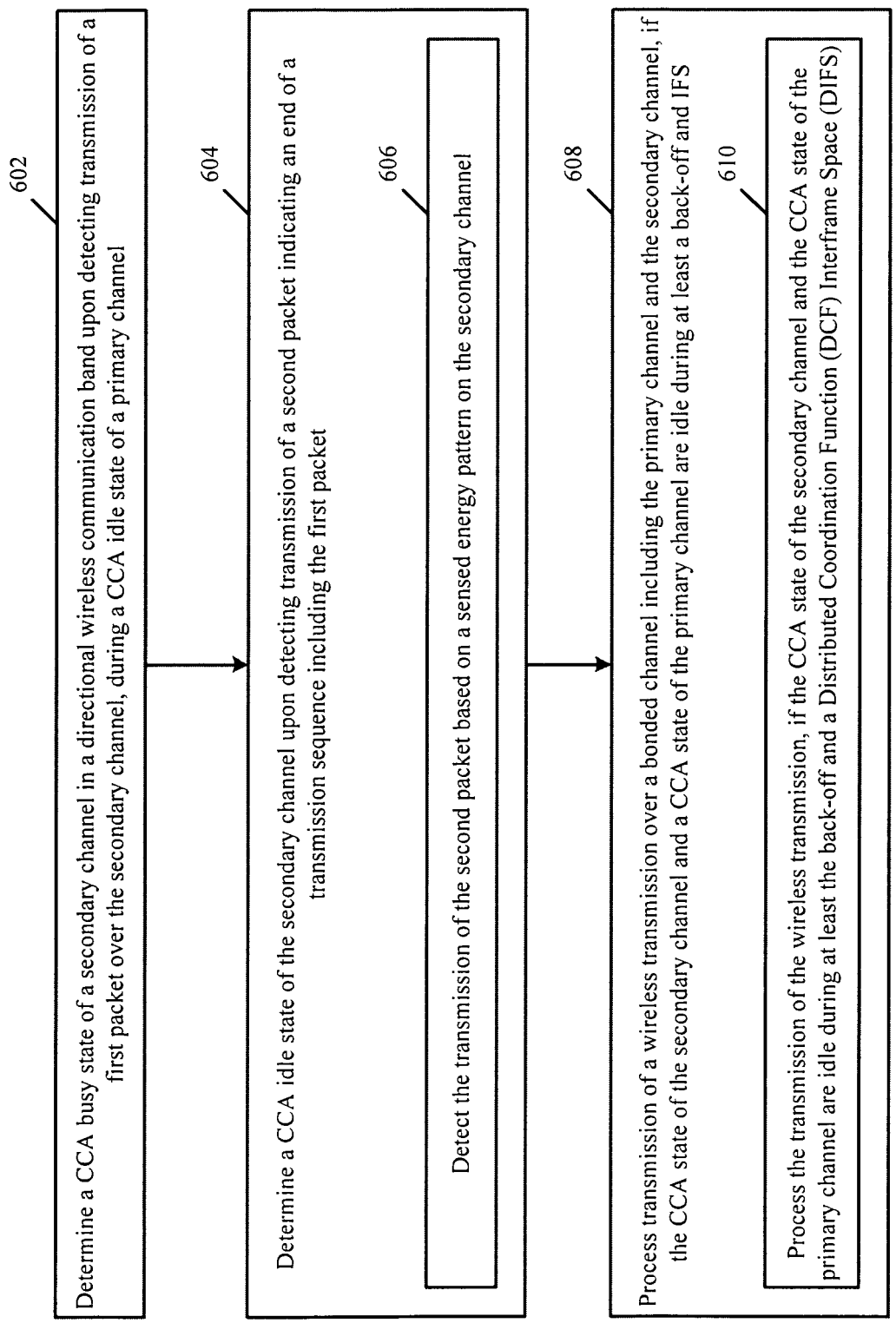
FIG. 6 is a schematic flow-chart illustration of a method of wireless transmission over a bonded channel, in accordance with some demonstrative embodiments.

Reference is made to FIG. 6, which schematically illustrates a method of wireless transmission over a bonded channel, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146

(FIG. 1); and/or a message processor, e.g., message processor 128 (FIG. 1), and/or message processor 158 (FIG. 1).

As indicated at block 602, the method may include determining a Clear Channel Assessment (CCA) busy state of a secondary channel in a directional wireless communication band upon detecting transmission of a first packet over the secondary channel, for example, during a CCA idle state of a primary channel. For example, controller 124 (FIG. 1) may be configured to control, cause and/or trigger device 102 (FIG. 1) to determine the CCA busy state 516 (FIG. 5) of the secondary channel upon detecting transmission of the PPDU1 (FIG. 5) over the secondary channel, e.g., as described above.

As indicated at block 604, the method may include determining a CCA idle state of the secondary channel upon detecting transmission of a second packet indicating an end of a transmission sequence including the first packet. For example, controller 124 (FIG. 1) may be configured to control, cause and/or trigger device 102 (FIG. 1) to determine the CCA idle state 533 (FIG. 5) of the secondary channel upon detecting transmission of CF-End packet 527 (FIG. 5) over the secondary channel, e.g., as described above.

As indicated at block 606, determining the CCA idle state may include detecting the transmission of the second packet based on a sensed energy pattern on the secondary channel. For example, device 102 (FIG. 1) may determine the CCA idle state 533 (FIG. 5) of the secondary channel, for example, based on the signature field 410 (FIG. 4) of CF-End packet 527 (FIG. 5), e.g., as described above.

As indicated at block 608, the method may include processing transmission of a wireless transmission over a bonded channel including the primary channel and the secondary channel, if the CCA states of the secondary channel and the primary channel are idle during at least an InterFrame Space (IFS) and a back-off. For example, controller 124 (FIG. 1) may be configured to control, cause and/or trigger device 102 (FIG. 1) to process transmission of the wireless transmission, e.g., the PPDU 5 (FIG. 5), for example, if the CCA states of the primary channel and the secondary channel are both idle during at least the IFS and a back-off, e.g., as described above.

As indicated at block 610, the method may include processing transmission of a wireless transmission over a bonded channel including the primary channel and the secondary channel, if the CCA states of the secondary channel and the primary channel are idle during at least a DIFS and a back-off. For example, controller 124 (FIG. 1) may be configured to control, cause and/or trigger device 102 (FIG. 1) to process transmission of the wireless transmission, e.g., the PPDU 5 (FIG. 5), for example, if the CCA states of the secondary channel and the primary channel are both idle during at least the DIFS and a back-off, e.g., as described above.

Figure 7:
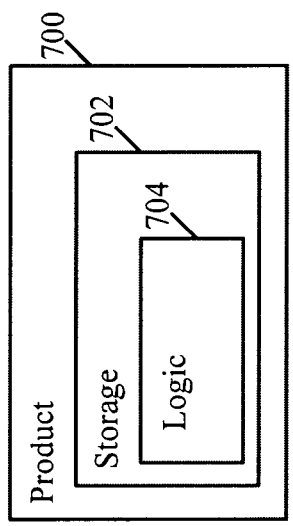
FIG. 7 is a schematic illustration of a product of manufacture, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform, trigger and/or implement one or more operations, communications and/or functionalities according to FIGS. 4, 5, and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to determine a secondary channel in a directional wireless communication band is at a Clear Channel Assessment (CCA) busy state, upon detecting transmission of a first packet over the secondary channel; determine the secondary channel is at a CCA idle state, upon detecting transmission of a second packet indicating an end of a transmission sequence comprising the first packet; and allow transmission of a wireless transmission over a bonded channel comprising a primary channel and the secondary channel, when the secondary channel and the primary channel are both at the CCA idle state during at least a back-off and an InterFrame Space (IFS).

Example 2 includes the subject matter of Example 1, and optionally, wherein the second packet is a Contention-Free end (CF-end) packet.

Example 3 includes the subject matter of Example 1 or 2, and optionally, wherein the apparatus is configured to cause the wireless station to detect the transmission of the second packet based on a sensed energy pattern on the secondary channel.

Example 4 includes the subject matter of Example 3, and optionally, wherein the second packet comprises a signature field corresponding to the energy pattern.

Example 5 includes the subject matter of any one of Examples 1-4, and optionally, wherein the apparatus is configured to cause the wireless station to detect the transmission of the second packet based on a duration of the second packet.

Example 6 includes the subject matter of any one of Examples 1-5, and optionally, wherein the apparatus is configured to cause the wireless station to allow transmission of the wireless transmission over the bonded channel, when the secondary channel and the primary channel are both at the CCA idle state during at least the back-off and a Distributed Coordination Function (DCF) IFS (DIFS).

Example 7 includes the subject matter of any one of Examples 1-6, and optionally, wherein the first packet comprises a Physical Layer Convergence Protocol (PLCP) Protocol Data Unit (PPDU).

Example 8 includes the subject matter of any one of Examples 1-7, and optionally, wherein the apparatus is configured to cause the wireless station to detect the transmission of the first packet based on a sensed energy on the secondary channel.

Example 9 includes the subject matter of any one of Examples 1-8, and optionally, wherein the directional wireless communication band is a Directional Multi-Gigabit (DMG) band.

Example 10 includes the subject matter of any one of Examples 1-9, and optionally, wherein the wireless station is a Directional Multi-Gigabit (DMG) Station (STA).

Example 11 includes the subject matter of any one of Examples 1-10, and optionally, comprising one or more directional antennas, a memory, and a processor.

Example 12 includes a system of wireless communication comprising a wireless station, the wireless station comprising one or more directional antennas; a memory; a processor, and a controller configured to cause the wireless station to determine a secondary channel in a directional wireless communication band is at a Clear Channel Assessment (CCA) busy state, upon detecting transmission of a first packet over the secondary channel; determine the secondary channel is at a CCA idle state, upon detecting transmission of a second packet indicating an end of a transmission sequence comprising the first packet; and allow transmission of a wireless transmission over a bonded channel comprising a primary channel and the secondary channel, when the secondary channel and the primary channel are both at the CCA idle state during at least a back-off and an InterFrame Space (IFS).

Example 13 includes the subject matter of Example 12, and optionally, wherein the second packet is a Contention-Free end (CF-end) packet.

Example 14 includes the subject matter of Example 12 or 13, and optionally, wherein the controller is configured to cause the wireless station to detect the transmission of the second packet based on a sensed energy pattern on the secondary channel.

Example 15 includes the subject matter of Example 14, and optionally, wherein the second packet comprises a signature field corresponding to the energy pattern.

Example 16 includes the subject matter of any one of Examples 12-15, and optionally, wherein the controller is configured to cause the wireless station to detect the transmission of the second packet based on a duration of the second packet.

Example 17 includes the subject matter of any one of Examples 12-16, and optionally, wherein the controller is configured to cause the wireless station to allow transmission of the wireless transmission over the bonded channel, when the secondary channel and the primary channel are both at the CCA idle state during at least the back-off and a Distributed Coordination Function (DCF) IFS (DIFS).

Example 18 includes the subject matter of any one of Examples 12-17, and optionally, wherein the first packet comprises a Physical Layer Convergence Protocol (PLCP) Protocol Data Unit (PPDU).

Example 19 includes the subject matter of any one of Examples 12-18, and optionally, wherein the controller is configured to cause the wireless station to detect the transmission of the first packet based on a sensed energy on the secondary channel.

Example 20 includes the subject matter of any one of Examples 12-19, and optionally, wherein the directional wireless communication band is a Directional Multi-Gigabit (DMG) band.

Example 21 includes the subject matter of any one of Examples 12-20, and optionally, wherein the wireless station is a Directional Multi-Gigabit (DMG) Station (STA).

Example 22 includes a method to be performed at a wireless station, the method comprising determining a secondary channel in a directional wireless communication band is at a Clear Channel Assessment (CCA) busy state, upon detecting transmission of a first packet over the secondary channel; determining the secondary channel is at a CCA idle state, upon detecting transmission of a second packet indicating an end of a transmission sequence comprising the first packet; and allowing transmission of a wireless transmission over a bonded channel comprising a primary channel and the secondary channel, when the secondary channel and the primary channel are both at the CCA idle state during at least a back-off and an InterFrame Space (IFS).

Example 23 includes the subject matter of Example 22, and optionally, wherein the second packet is a Contention-Free end (CF-end) packet.

Example 24 includes the subject matter of Example 22 or 23, and optionally, comprising detecting the transmission of the second packet based on a sensed energy pattern on the secondary channel.

Example 25 includes the subject matter of Example 24, and optionally, wherein the second packet comprises a signature field corresponding to the energy pattern.

Example 26 includes the subject matter of any one of Examples 22-25, and optionally, comprising detecting the transmission of the second packet based on a duration of the second packet.

Example 27 includes the subject matter of any one of Examples 22-26, and optionally, comprising allowing transmission of the wireless transmission over the bonded channel, when the secondary channel and the primary channel are both at the CCA idle state during at least the back-off and a Distributed Coordination Function (DCF) IFS (DIFS).

Example 28 includes the subject matter of any one of Examples 22-27, and optionally, wherein the first packet comprises a Physical Layer Convergence Protocol (PLCP) Protocol Data Unit (PPDU).

Example 29 includes the subject matter of any one of Examples 22-28, and optionally, comprising detecting the transmission of the first packet based on a sensed energy on the secondary channel.

Example 30 includes the subject matter of any one of Examples 22-29, and optionally, wherein the directional wireless communication band is a Directional Multi-Gigabit (DMG) band.

Example 31 includes the subject matter of any one of Examples 22-30, and optionally, wherein the wireless station is a Directional Multi-Gigabit (DMG) Station (STA).

Example 32 includes a product comprising one or more tangible computer-readable non-transitory storage media comprising computer-executable instructions operable to, when executed by at least one computer processor, enable the at least one computer processor to implement one or more operations at a wireless station, the operations comprising determining a secondary channel in a directional wireless communication band is at a Clear Channel Assessment (CCA) busy state, upon detecting transmission of a first packet over the secondary channel; determining the secondary channel is at a CCA idle state, upon detecting transmission of a second packet indicating an end of a transmission sequence comprising the first packet; and allowing transmission of a wireless transmission over a bonded channel comprising a primary channel and the secondary channel, when the secondary channel and the primary channel are both at the CCA idle state during at least a back-off and an InterFrame Space (IFS).

Example 33 includes the subject matter of Example 32, and optionally, wherein the second packet is a Contention-Free end (CF-end) packet.

Example 34 includes the subject matter of Example 32 or 33, and optionally, wherein the operations comprise detecting the transmission of the second packet based on a sensed energy pattern on the secondary channel.

Example 35 includes the subject matter of Example 34, and optionally, wherein the second packet comprises a signature field corresponding to the energy pattern.

Example 36 includes the subject matter of any one of Examples 32-35, and optionally, wherein the operations comprise detecting the transmission of the second packet based on a duration of the second packet.

Example 37 includes the subject matter of any one of Examples 32-36, and optionally, wherein the operations comprise allowing transmission of the wireless transmission over the bonded channel, when the secondary channel and the primary channel are both at the CCA idle state during at least the back-off and a Distributed Coordination Function (DCF) IFS (DIFS).

Example 38 includes the subject matter of any one of Examples 32-37, and optionally, wherein the first packet comprises a Physical Layer Convergence Protocol (PLCP) Protocol Data Unit (PPDU).

Example 39 includes the subject matter of any one of Examples 32-38, and optionally, wherein the operations comprise detecting the transmission of the first packet based on a sensed energy on the secondary channel.

Example 40 includes the subject matter of any one of Examples 32-39, and optionally, wherein the directional wireless communication band is a Directional Multi-Gigabit (DMG) band.

Example 41 includes the subject matter of any one of Examples 32-40, and optionally, wherein the wireless station is a Directional Multi-Gigabit (DMG) Station (STA).

Example 42 includes an apparatus of a wireless station, the apparatus comprising means for determining a secondary channel in a directional wireless communication band is at a Clear Channel Assessment (CCA) busy state, upon detecting transmission of a first packet over the secondary channel; means for determining the secondary channel is at a CCA idle state, upon detecting transmission of a second packet indicating an end of a transmission sequence comprising the first packet; and means for allowing transmission of a wireless transmission over a bonded channel comprising a primary channel and the secondary channel, when the secondary channel and the primary channel are both at the CCA idle state during at least a back-off and an InterFrame Space (IFS).

Example 43 includes the subject matter of Example 42, and optionally, wherein the second packet is a Contention-Free end (CF-end) packet.

Example 44 includes the subject matter of Example 42 or 43, and optionally, comprising means for detecting the transmission of the second packet based on a sensed energy pattern on the secondary channel.

Example 45 includes the subject matter of Example 44, and optionally, wherein the second packet comprises a signature field corresponding to the energy pattern.

Example 46 includes the subject matter of any one of Examples 42-45, and optionally, comprising means for detecting the transmission of the second packet based on a duration of the second packet.

Example 47 includes the subject matter of any one of Examples 42-46, and optionally, comprising means for allowing transmission of the wireless transmission over the bonded channel, when the secondary channel and the primary channel are both at the CCA idle state during at least the back-off and a Distributed Coordination Function (DCF) IFS (DIFS).

Example 48 includes the subject matter of any one of Examples 42-47, and optionally, wherein the first packet comprises a Physical Layer Convergence Protocol (PLCP) Protocol Data Unit (PPDU).

Example 49 includes the subject matter of any one of Examples 42-48, and optionally, comprising means for detecting the transmission of the first packet based on a sensed energy on the secondary channel.

Example 50 includes the subject matter of any one of Examples 42-49, and optionally, wherein the directional wireless communication band is a Directional Multi-Gigabit (DMG) band.

Example 51 includes the subject matter of any one of Examples 42-50, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
start a first period upon detecting a Clear Channel Assessment (CCA) idle state of a primary channel in a directional wireless communication band, the first period comprising at least a back-off and an InterFrame Space (IFS);
determine a secondary channel in the directional wireless communication band is at a CCA busy state, upon detecting transmission of a first packet over the secondary channel during the first period;
maintain the CCA busy state of the secondary channel until detecting transmission of a second packet over the secondary channel, the second packet indicating an end of a transmission sequence comprising the first packet,
determine the secondary channel is at the CCA idle state, upon detecting transmission of the second packet;
start a second period when the secondary channel is at the CCA idle state, the second period comprising at least the back-off and the IFS; and
allow transmission of a wireless transmission over a bonded channel comprising the primary channel and the secondary channel, when the secondary channel and the primary channel are both at the CCA idle state during the second period.

2. The apparatus of claim 1, wherein the second packet is a Contention-Free end (CF-end) packet.

3. The apparatus of claim 1 configured to cause the wireless station to detect the transmission of the second packet based on a sensed energy pattern on the secondary channel.

4. The apparatus of claim 3, wherein the second packet comprises a signature field corresponding to said energy pattern.

5. The apparatus of claim 1 configured to cause the wireless station to detect the transmission of the second packet based on a duration of the second packet.

6. The apparatus of claim 1, wherein the second period comprises at least the back-off and a Distributed Coordination Function (DCF) IFS (DIFS).

7. The apparatus of claim 1, wherein the first packet comprises a Physical Layer Convergence Protocol (PLCP) Protocol Data Unit (PPDU).

8. The apparatus of claim 1 configured to cause the wireless station to detect the transmission of the first packet based on a sensed energy on the secondary channel.

9. The apparatus of claim 1, wherein the directional wireless communication band is a Directional Multi-Gigabit (DMG) band.

10. The apparatus of claim 1, wherein the wireless station is a Directional Multi-Gigabit (DMG) Station (STA).

11. The apparatus of claim 1 comprising one or more directional antennas, a memory, and a processor.

12. A system of wireless communication comprising a wireless station, the wireless station comprising:
one or more directional antennas;
a memory;
a processor; and
a controller configured to cause the wireless station to:
start a first period upon detecting a Clear Channel Assessment (CCA) idle state of a primary channel in a directional wireless communication band, the first period comprising at least a back-off and an InterFrame Space (IFS);
determine a secondary channel in the directional wireless communication band is at a CCA busy state, upon detecting transmission of a first packet over the secondary channel during the first period;
maintain the CCA busy state of the secondary channel until detecting transmission of a second packet over the secondary channel, the second packet indicating an end of a transmission sequence comprising the first packet;
determine the secondary channel is at the CCA idle state, upon detecting transmission of the second packet;
start a second period when the secondary channel is at the CCA state, the second period comprising at least the back-off and the IFS; and
allow transmission of a wireless transmission over a bonded channel comprising the primary channel and the secondary channel, when the secondary channel and the primary channel are both at the CCA idle state during the second period.

13. The system of claim 12, wherein the controller is configured to cause the wireless station to detect the transmission of the second packet based on a sensed energy pattern on the secondary channel.

14. A method to be performed at a wireless station, the method comprising:
starting a first period upon detecting a Clear Channel Assessment (CCA) idle state, of a primary channel in a directional wireless communication band, the first period comprising at least a back-off and an InterFrame Space (IFS);
determining a secondary channel in the directional wireless communication band is at a CCA busy state, upon detecting transmission of a first packet over the secondary channel during the first period;
maintaining the CCA busy state of the secondary channel until detecting transmission of a second packet over the secondary channel the second packet indicating an end of a transmission sequence comprising the first packet;
determining the secondary channel is at the CCA idle state, upon detecting transmission of the second packet;
starting a second period when the secondary channel is at the CCA idle state, the second period comprising at least the back-off and the IFS; and
allowing transmission of a wireless transmission over a bonded channel comprising the primary channel and the secondary channel, when the secondary channel and the primary channel are both at the CCA idle state during the second period.

15. The method of claim 14, wherein the second packet is a Contention-Free end (CF-end) packet.

16. A product comprising one or more tangible computer-readable non-transitory storage media comprising computer-executable instructions operable to, when executed by at least one processor, enable the at least one processor to cause a wireless station to:
start a first period upon detecting a Clear Channel Assessment (CCA) idle state of a primary channel in a directional wireless communication band, the first period comprising at least a back-off and an InterFrame Space (IFS);
determine a secondary channel in the directional wireless communication band is at a CCA busy state, upon detecting transmission of a first packet over the secondary channel, during the first period;

maintain the CCA busy state of the secondary channel until detecting transmission of a second packet over the secondary channel the second packet indicating an end of a transmission sequence comprising the first packet;

determine the secondary channel is at the CCA idle state, upon detecting transmission of the second packet;

start a second period when the secondary channel is at the CCA idle state, the second period comprising at least the back-off and the IFS; and allow transmission of a wireless transmission over a bonded channel comprising the primary channel and the secondary channel, when the secondary channel and the primary channel are both at the CCA idle state during the second period.

17. The product of claim 16, wherein the second packet is a Contention-Free end (CF-end) packet.

18. The product of claim 16, wherein the instructions, when executed, cause the wireless station to detect the transmission of the second packet based on a sensed energy pattern on the secondary channel.

19. The product of claim 18, wherein the second packet comprises a signature field corresponding to said energy pattern.

20. The product of claim 16, wherein the instructions, when executed, cause the wireless station to detect the transmission of the second packet based on a duration of the second packet.

21. The product of claim 16, wherein the second period comprises at least the back-off and a Distributed Coordination Function (DCF) IFS (DIFS).

22. The product of claim 16, wherein the first packet comprises a Physical Layer Convergence Protocol (PLCP) Protocol Data Unit (PPDU).

23. The product of claim 16, wherein the instructions, when executed, cause the wireless station to detect the transmission of the first packet based on a sensed energy on the secondary channel.

24. The product of claim 16, wherein the directional wireless communication band is a Directional Multi-Gigabit (DMG) band.

25. The product of claim 16, wherein the wireless station is a Directional Multi-Gigabit (DMG) Station (STA).

* * * * *

UNITED STATES PATENT AND TRADEMARK OFFICE
CERTIFICATE OF CORRECTION

PATENT NO. : 10,009,774 B2  
APPLICATION NO. : 14/998245  
DATED : June 26, 2018  
INVENTOR(S) : Solomon B. Trainin et al.

Page 1 of 1

It is certified that error appears in the above-identified patent and that said Letters Patent is hereby corrected as shown below:

In the Claims

In Column 25, Line 21, in Claim 1, delete "first packet," and insert --first packet;--, therefor.

In Column 26, Line 17, in Claim 12, delete "CCA state," and insert --CCA idle state,--, therefor.

In Column 26, Line 31, in Claim 14, delete "idle state," and insert --idle state--, therefor.

In Column 26, Line 41, in Claim 14, delete "secondary channel the" and insert --secondary channel, the--, therefor.

In Column 27, Line 2, in Claim 16, delete "channel, during" and insert --channel during--, therefor.

In Column 27, Line 5, in Claim 16, delete "channel the" and insert --channel, the--, therefor.

Signed and Sealed this  
Twenty-eighth Day of August, 2018

Andrei Iancu  
*Director of the United States Patent and Trademark Office*